United States Patent [19]

Gibson

[11] Patent Number: 4,914,584
[45] Date of Patent: Apr. 3, 1990

[54] RULES AND APPARATUS FOR AN INTERMEDIATE CODE MEMORY THAT BUFFERS CODE SEGMENTS

[76] Inventor: Glenn A. Gibson, 4824 Ballerina, El Paso, Tex. 79922

[21] Appl. No.: 258,843

[22] Filed: Oct. 17, 1988

[51] Int. Cl.⁴ .......................... G06F 9/38; G06F 9/40; G06F 9/42
[52] U.S. Cl. .................. 364/200; 364/231.8; 364/261.7; 364/263.1; 364/244.3
[58] Field of Search ... 364/200 MS File, 900 MS File

[56] References Cited

U.S. PATENT DOCUMENTS

| | | | |
|---|---|---|---|
| 4,110,822 | 8/1978 | Porter et al. | 364/200 |
| 4,399,507 | 8/1983 | Cosgrove | 364/200 |
| 4,551,799 | 11/1985 | Ryan et al. | 364/200 |
| 4,755,935 | 7/1988 | Davis et al. | 364/200 |
| 4,777,594 | 10/1988 | Jones et al. | 364/200 |
| 4,783,736 | 11/1988 | Ziegler et al. | 364/200 |
| 4,794,521 | 12/1988 | Ziegler et al. | 364/200 |

OTHER PUBLICATIONS

Harold Stone, *High-Performance Computer Architecture*, Addison-Wesley, 1987.

Primary Examiner—David Y. Eng
Attorney, Agent, or Firm—James R. Young

[57] ABSTRACT

An intermediate code memory for taking instructions from main memory and supplying them inline to a processing element is disclosed. Inputting instructions into the intermediate code memory from main memory is done using a DMA channel and may be done simultaneously with outputting instructions to the processing element. Outputting can be done from any location that is outside a dynamic window, whose position and size depend on the area in the code memory to which the code is currently being input. In addition, the code memory contains a LIFO stack and executes all subprogram call and return instructions so that the instructions presented to the processing element are inline. Normally, the instructions are output sequentially from the code memory, however, subprogram calls and returns, certain unconditional branch instructions executed by the intermediate code memory, and addresses passed from the processing element may change the instruction sequence.

12 Claims, 2 Drawing Sheets

RULES AND APPARATUS FOR AN INTERMEDIATE CODE MEMORY THAT BUFFERS CODE SEGMENTS

FIELD OF THE INVENTION

This invention relates to information processing systems, and more particularly to supplying instructions to the processing elements of such systems. Even more particularly, this invention relates to an intermediate code memory that is positioned between a main memory and a processing element to prefetch code segments from the main memory and supply an inline instruction stream to the processing element.

BACKGROUND OF THE INVENTION

Any processing element must receive its instructions from some form of code memory. Ideally, when the processing element is ready to execute the next instruction, that instruction would always be immediately available. For computers with relatively slow processing elements whose speeds are matched with those of its main memory, the instructions can be drawn from main memory without the processor waiting an undue amount of time. For systems with faster processing elements, some form of intermediate code memory is needed to match main memory and processor speeds. The problem is further complicated by the requirement of subprogram calls and branch instructions in the code, since these make the location of the next instruction unpredictable. Without subprogram calls and branch instructions, the intermediate code memory between a main memory and a processing element could be a simple first-in, first-out queue. However, because of these instructions, the queue would need to be flushed and reloaded every time the processor encounters one of them, which would not be very satisfactory. The longer the queue, the more time it would take to reload it.

One form of intermediate memory is a cache—such as those defined by Harold Stone in *High-performance Computer Architecture* (Addison-Wesley, 1987)—which can be used to compensate for the mismatch between the main memory and processor speeds. Caches are fast, small, and relatively expensive memories that are placed between main memory and the processing element. They take advantage of the fact that loops cause instruction execution to be concentrated within a small area of memory, therefore the cache stores this small area and can deliver instructions into the processing element at average speeds approaching that of the cache memory. When a processor requested instruction is located in cache a hit occurs and the instruction is supplied to the processing element within the access time of the cache. Only when there is a miss (i.e. the instruction is not located in cache) does the instruction have to be retrieved from main memory, which has a much longer access time. The larger the cache the more likely it will be that the cache can completely contain a program's loops, and the less likely it is that a miss will occur. However, when a miss does occur the access time is dictated by the access time of main memory. Since cache memories do not anticipate instruction execution, and do not understand subprogram calls and branch instructions, a miss often occurs during subprogram calls or branch operations.

The present invention is designed to cooperate with the invention in the application *Rules and Apparatus for a Code RAM that Buffers Prefetched Instruction Sequences* by Glenn A. Gibson, filed Jan. 10, 1988, as application Ser. No. 07/144,948 now U.S. Pat. No. 4,876,642 issued 10 Oct. 1989. This invention and the previous invention, referred to as the code buffer, are placed between the processing element and main memory to make instructions immediately available to the processing element a very high percentage of the time. To function properly, the code buffer must receive its instructions inline (i.e., without subprogram calls or returns in the instruction stream) and the present invention satisfies this requirement by maintaining its own last-in/first-out (LIFO) stack of subprogram return addresses. The present invention is also capable of prefetching entire code segments (such as subprograms) from main memory while it is supplying instructions to the processing element through the code buffer. The present invention and the code buffer achieve their effectiveness by having the small, but very fast, code buffer retain all loops of small to moderate length while the present invention supplies inline instructions to the code buffer and prefetches entire code segments from main memory.

The use of a LIFO stack to store return addresses is not new, but normally the stack is put in the processing element or the data memory. The history of using a LIFO stack for this purpose is outlined by Cosgrove, et al, in U.S. Pat. No. 4,399,507. Cosgrove, et al, even placed a copy of the address at the top of the stack in a register in the instruction fetch phase of the processing element's pipeline so that the return instructions could be detected early in the pipeline and have the return address immediately available. This prevented the instruction pipeline from being emptied by return branches. The present invention goes much further by placing the whole stack in the code memory hierarchy and even provides for the subprogram calls and returns to be executed by intermediate code memory logic that monitors the instruction stream.

SUMMARY OF THE INVENTION

It is an object of the present invention to provide an intermediate code memory for drawing instructions from main memory and supplying them to a processing element in such a way as to compensate for a mismatch between the processing element speed and main memory speed.

Another object of this invention is to provide an inline stream of instructions to the processing element by including in this invention a last-in/first-out (LIFO) stack and having this invention execute all subprogram call and return instructions and certain other branch instructions. The LIFO stack is used to store the return addresses indicated by the subprogram call instructions. The return addresses are pushed onto the stack by the call instructions and popped from the stack by the return instructions in the conventional manner.

Still another object of this invention is to use direct memory access (DMA) to load entire code segments into its memory while simultaneously supplying instructions to a processing element.

Yet another object of this invention is to provide a dynamic window in its memory that separates the inputting from main memory from the outputting to the processing element.

These and other objects are accomplished with a one-port or two-port intermediate code memory that uses a DMA channel to load entire code segments from main memory while outputting inline instructions to a processing element. If a two-port memory is used, one port is for inputting and the other is for outputting. The intermediate code memory receives its commands and command related information, such as the DMA count and address information, through the same port that inputs the code being temporarily stored. A dynamically changing window is maintained within the intermediate code memory to separate the input and output activities. The boundaries of the window are determined by the area currently being input to by the DMA channel. All inputting is to locations within the window and all outputting is from locations outside the window.

In addition to buffering instructions, the intermediate code memory contains a LIFO stack and executes all subprogram call and return instructions, certain unconditional branch instructions, and certain branches that are initiated by instructions being executed by the processing element. Normally, instructions are output to the processing element in sequence. However, the control and decode logic of the intermediate code memory monitors the output instruction stream and when a subprogram call is detected it pushes the calling program address, which indicates the location from which the next calling program instruction is to be output after a return is executed, onto the LIFO stack. It then transfers instructions from the subprogram address to the processing element until a subprogram return is detected, at which time the calling program address is popped from the stack and instruction outputting continues from the calling program address. The call instruction in the calling program and the return instruction in the subprogram are not output to the processing element, thus the processing element receives a continuous stream of instructions as if the subprogram's instructions had been coded in line. Also, certain unconditional branch instructions, referred to as ICM branches, are not output to the processing element but are used only to determine the location of the next instruction to be output. Finally, some branch instructions, called outside branches, that are output to and executed by the processing element may pass an address back to the intermediate code memory which then uses this address to determine the next instruction to be output.

BRIEF DESCRIPTION OF DRAWINGS

A better understanding of the present invention may be had from the following description of the preferred embodiment when read in the light of the accompanying drawings whose descriptions are.

DESCRIPTION OF PREFERRED EMBODIMENT

The following description is of the best presently contemplated mode of carrying out the present invention. This description is not to be taken in a limiting sense, but is made for the purpose of describing the general principles of the invention. The scope of the invention should be determined with reference to the appended claims.

Figure 1:
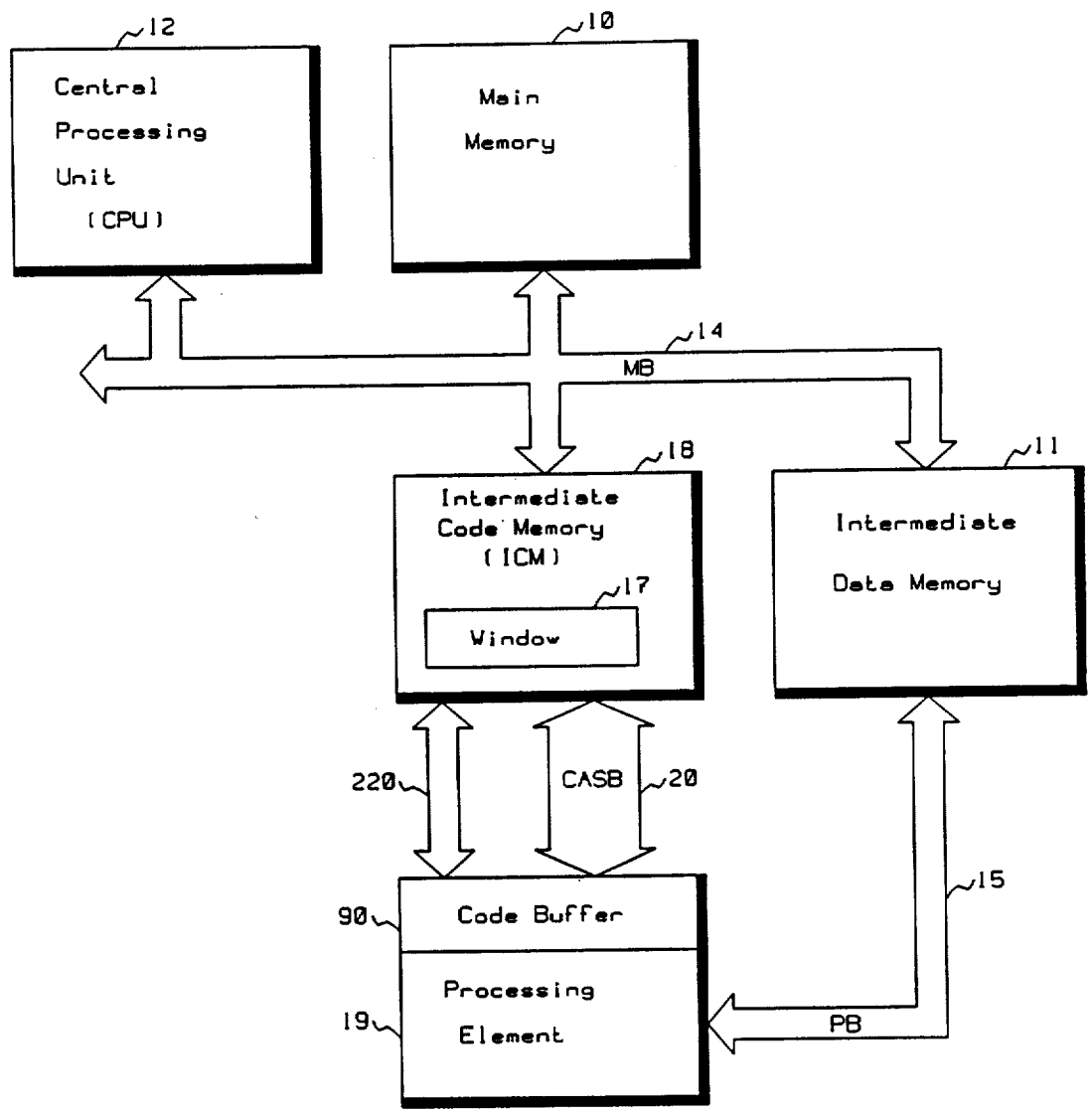
FIG. 1 shows where the intermediate code memory described in the present invention is placed within an overall system.

Referring to FIG. 1, a two-port Intermediate Code Memory (ICM) 18 is placed between a Main Memory 10 and a Code Buffer 90 which is built into a Processing Element 19. The ICM 18 receives its commands from a Central Processing Unit (CPU) 12. The overall system assumes the code and data streams are separated with the Intermediate Data Memory 11 being used to buffer the data into the Processing Element 19. The Memory Bus (MB) 14 provides the command, code, and data transfer link between the Main Memory 10, the ICM 18, the Intermediate Data Memory 11, and the CPU 12 as well as providing the primary information transfer link for the system as a whole. The Code/Address/Status Bus (CASB) 20 and the control signals 220 are the link between the ICM 18 and the Code Buffer 90. The Processor Bus (PB) 15 is the link between the Intermediate Data Memory 11 and the Processing Element 19.

Within the ICM 18 there is a dynamically changing Window 17 that separates the transfer of code into the ICM 18 via MB 14 from the output of code to the Code Buffer 90 via the CASB 20. Transfers into the ICM 18 must be to locations within the Window 17 and transfers out of the ICM 18 must be to locations outside the Window 17.

There are two processes that may be in simultaneous operation while the ICM 18 is in use. They are the:

Input process which inputs code segments into the ICM 18 from Main Memory 10 using a DMA channel; and the Output process which outputs an inline instruction stream to the Code Buffer 90.

Either of these processes may operate by itself or both may operate simultaneously. The ICM 18 is assigned four consecutive addresses on the MB 14, with the lowest address being divisible by 4. The address with the low-order bits equal to 00 is used to read the status of the ICM 18. A 01 in the low-order bits of the address initiates th input process and a 10 in these bits initiates the output process. A 1 in both low-order bits starts both processes.

Figure 2:
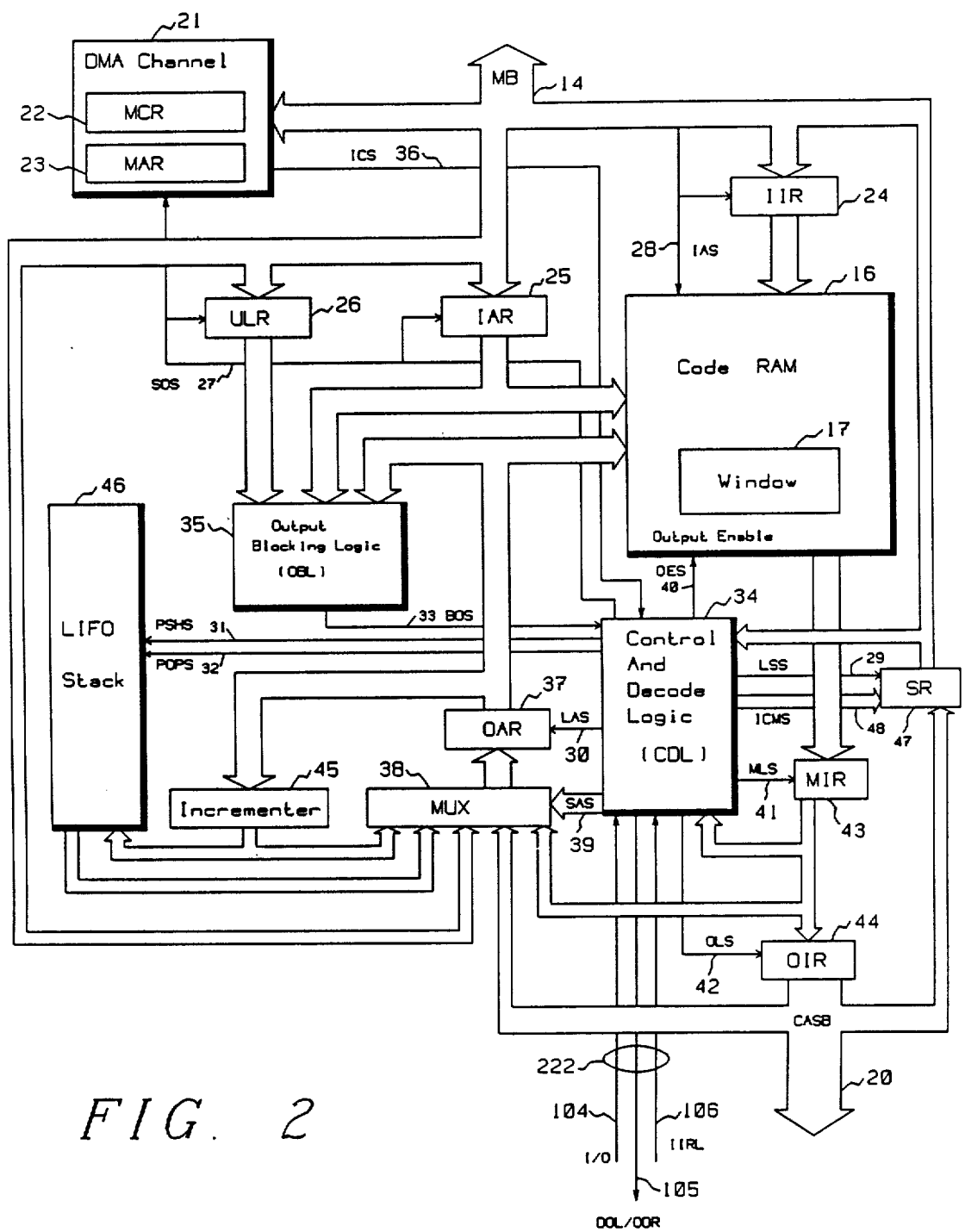
FIG. 2 summarizes the major components of the intermediate code memory described in the present invention.

FIG. 2 is a detailed block diagram showing the components of the ICM 18. When the input process is initiated by addressing the ICM 18 with the low-order bit equal to 1, the Memory Count Register (MCR) 22 and the Memory Address Register (MAR) 23 of the DMA Channel 21, the Upper Limit Register (ULR) 26, and Input Address Register (IAR) 25 are filled from the data portion of MB 14. Initially, the MAR 23 contains the beginning address in Main Memory 10 (FIG. 1) of the code segment being transferred into the ICM 18 and MCR 22 contains the number of instructions in this code segment. The IAR 25 initially contains the Code RAM 16 address into which the first transfer will be made. With each transfer, the MAR 23 and IAR 25 are incremented by the number of instructions input during a single transfer and the MCR 22 is decremented by the same amount. When the MCR 22 becomes 0 the DMA activity stops and the input process is terminated. The Start Output Signal (SOS) 27 is output by the Control and Decode Logic (CDL) 34 and is used to latch new contents into the MCR 22, MAR 23, IAR 25, and ULR 26 when an ICM 18 address with a low-order bit of 1 is detected. The purpose of the CDL 34 is to control the overall activity of the ICM 18.

The ICM 18 is best utilized by downloading a collection of subprograms to it from the CPU 12 (FIG. 1) by first having the CPU 12 issue a sequence of commands to the ICM 18, and then downloading routines that use these subprograms to perform specific tasks. For example, a subprogram could be downloaded by the CPU 12 by having the CPU 12 put the desired contents of the MCR 22, MAR 23, IAR 25, and ULR 26 on the data portion of the MB 14 and the address of the ICM 18 whose low order bits are 01 on the address portion of the MB 14. When the DMA Channel 21 has completed the transfer it could send an interrupt request to the CPU 12 and a second subprogram could be downloaded. The process could be repeated until all of the given collection of subprograms have been transferred. These subprograms could then be used by a variety of routines to perform specific tasks. When a task is to be performed by the Processing Element 19, the routine to perform the task (which could use any of the collection of previously downloaded subprograms) could be downloaded. The execution of a routine to perform a task could be initiated along with the downloading by using the ICM 18 address whose low order bits are 11. When one task is complete, another task could be performed by sending the appropriate command from the CPU 12 to the ICM 18. This would allow the CPU 12 to execute very complex tasks by issuing single commands.

The Code RAM 16 is the actual storage circuitry of the ICM 18 and the Window 17 is a changing area within the Code RAM 16. The Window 17 includes all locations whose addresses are greater than or equal to the current contents of IAR 25 and less than the contents of the ULR 26. The contents of the ULR 26 is the upper limit of the Window 17 and should be greater than or equal to the sum of the initial contents of the IAR 25 and MCR 22 so that all inputting is to locations within the Window 17. The Input Instruction Register (IIR) 24 is used to buffer instructions from the data portion of MB 14 into the Code RAM 16. The Input Available Signal (IAS) 28, contained in the MB 14, causes the instruction to be latched into the IIR 24 and indicates to the Code RAM 16 that an instruction is available to be input. The Input Complete Signal (ICS) 36 indicates to the CDL 34 that the MCR 22 has decremented to 0 and the input process has finished.

When the ICM 18 is addressed and the two low-order address bits are 10, the LIFO stack 46 is initialized by being emptied, and the output process is begun. If the input process is not active, then windowing is not being used and outputting can be from any Code RAM 16 location. Otherwise, windowing is being used and outputting must be from the Code RAM 16 locations outside the Window 17. If the low-order bits of the ICM 18 address are 11 then both the input and utput processes are started, windowing is being used, and outputting must be from locations outside the Window 17. The Output Address Register (OAR) 37 indicates the location in the Code RAM 16 from which the current instruction is being taken. Any time windowing is being used the Output Blocking Logic (OBL) 35 compares the contents of the ULR 26, IAR 25, and OAR 37 and deactivates the Block Output Signal (BOS) 33 whenever the OAR 37 address is outside the Window 17. When the BOS 33 is active, outputting is blocked until the Window 17 changes, causing the address in the OAR 37 to become outside the Window 17, or the input process terminates. If the input process is not active for any reason, then the BOS 33 is ignored by the CDL 34.

When the CDL 34 determines an output is to be made it enables the output of the Code RAM 16 by activating the Output Enable Signal (OES) 40 which causes the contents of the location whose address is currently in the OAR 37 to be output. The CDL 34 then latches this output into the Memory Instruction Register (MIR) 43 by activating the Memory Latch Signal (MLS) 41.

The CDL 34 monitors the output of the MIR 43 and executes the instruction in the MIR 43 if it is an ICM branch, subprogram call, subprogram return, or task complete instruction. An ICM branch is an unconditional branch that is executed by the ICM 18 and is solely to change the sequence of instructions output by the ICM 18. Both an ICM branch and a subprogram call include the ICM 18 address to be branched to in their operand fields. The output of the OAR 37 is also applied to the Incrementer 45 whose output is 1 greater than the contents of the OAR 37. If a subprogram call is detected, the CDL 34 activates the Push Signal (PSHS) 31 which causes the output of the Incrementer 45 to be pushed onto the LIFO Stack 46. If a subprogram return is detected, the CDL 34 activates the Pop Signal (POPS) 32 which causes the top of the LIFO Stack 46 to be popped and output to the multiplexer (MUX) 38.

If the Input/Output (I/O) line 104 (set by the code buffer 90, shown in FIG. 1) is 0, and the MIR 43 contains an instruction that is to be output from the ICM 18 (i.e., an instruction that is not to be executed by the CDL 34 is in the MIR 43), and the Input Instruction Request Line (IIRL) 106 (controlled by the Code Buffer 90) is active, then the CDL 34 activates the Output Latch Signal (OLS) 42. The OLS 42 latches the output of the MIR 43 into the Output Instruction Register (OIR) 44 whose output is to the CASB 20. Once the OIR 44 is filled, the Data On Line/Output Data Received (DOL/ODR) 105 line is activated to indicate to the Code Buffer 90 that an instruction is available.

It is possible for an instruction, referred to as an outside branch, being executed by the Processing Element 19 to cause a branch in the ICM 18. The Code Buffer 90 indicates that it has placed an address/status combination on the CASB 20 by setting the I/O line 104 to 1. This causes the CDL 34 to activate the Latch Status Signal (LSS) 29 to latch the status on the CASB 20 into the Status Register (SR) 47. The CDL then uses the address on the CASB 20 as the address of the next instruction to be output, thereby causing a branch out of sequence. After the CDL 34 puts the CASB 20 address in the OAR 37, it sets the DOL/ODR 105 line to 1 signaling the Code Buffer 90 that the address/status may be dropped. When an outside branch is taken by the ICM 18 the contents of the MIR 43 are not transferred to the OIR 44, but are simply overwritten by the next output from the Code RAM 16.

The CDL 34 updates the OAR 37 by activating the Latch Address Signal (LAS) 30, at which time the output of the MUX 38 is latched into the OAR 37. The output of the MUX 38 may originate from one of five sources depending on the Select Address Signals (SAS) 39. These five sources and what causes them to be selected are summarized as follows:

| Source | Cause of Selection |
|---|---|
| Data portion of the MB 14 | Receipt of an ICM 18 address with the next to low-order bit being 1 (i.e., the output process is being initiated). |
| Top of the LIFO Stack 46 | Execution of a subprogram return. |
| Output of the MIR 43 | Execution of a subprogram call or an ICM branch. |
| Address from CASB 20 | Execution of an outside branch instruction by the Processing Element 19 (via the code buffer 90) which has set I/O 104 to 1 and |

| Source | Cause of Selection |
|---|---|
| | placed address/status data on the CASB 20. |
| Incrementer 45 output | When none of the other sources provide the address, it is taken from the Incrementer 45. |

The SR 47 is also used to store the status of the ICM 18. This status is sent to the SR 47 from the CDL 34 via the Intermediate Code Memory Status (ICMS) lines 48. In particular, these status bits would indicate whether or not the input or output process is active. Commands that initiate the input or output processes should not be sent to the ICM 18 while the corresponding process is already active. Also, a command to initiate the input process is rejected by the ICM 18 if it creates a Window 17 that includes a location that is currently being used to output to the processing element.

The output process is terminated and an active task complete signal is placed on one of the control lines in MB 14 when a task complete instruction is detected in the MIR 43 by the CDL 34. The output process can be restarted by having the CPU 12 address the ICM 18 using an address whose two low order bits are either 10 or 11.

An external reset signal can be sent to the ICM 18 via one of the control lines in MB 14. An external reset would cause the input and output processes to become inactive, the LIFO Stack 46 to be considered empty, the ULR 26 to be set equal to the highest Code RAM 16 address, and all other registers to be cleared to 0.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. An intermediate code memory located between a main memory and a processing element of a computer, comprising:
   code RAM means for temporarily storing processor instructions, said code RAM means having input addressing means and output addressing means;
   main memory transfer means for transferring a segment of processor instructions from said main memory to said code RAM means;
   processing element transfer means for transferring a stream of processor instructions from a location in said code RAM means defined by said code RAM output address means to said processing element;
   means for detecting and processing subprogram calls and returns and branch instructions comprising
      stack means for storing code RAM output addresses,
      stack transfer means for transferring the contents of said code RAM output addressing means to said stack means,
      code RAM address transfer means for transferring an output of said stack means to said code RAM output addressing means,
      instruction transfer means for transferring an address within a branch instruction to said code RAM output addressing means,
      first control means for detecting subprogram call instructions and activating said stack transfer means, and
      second control means for detecting subprogram return instructions and activating said code RAM address transfer means,
      third control means for detecting branch instructions and activating said instruction transfer means; and
   means for removing said subprogram call and said subprogram return and said branch instructions from said instruction stream before said processor instructions are transferred to said processing element.

2. The intermediate code memory of claim 1 wherein said main memory transfer means further comprises direct memory access channel means for automatically transferring a predefined number of instructions from said main memory to said code RAM means.

3. The intermediate code memory of claim 1 wherein said stack means comprises last-in/first-out memory means whereby said last code RAM output address transferred to said stack means by said stack transfer means is the first code RAM output address to be removed from stack means by said code RAM address transfer means.

4. The intermediate code memory of claim 3 further comprising:
   detecting means for detecting an outside branch signal from said processing element which indicates an outside branch is being processed; and
   means for transferring an address returned to said intermediate code memory from said processing element to said code RAM output addressing means;
   whereby an outside branch instruction is executed.

5. The intermediate code memory of claim 4 further comprising means for starting and stopping said main memory transfer means and means for starting and stopping said processing element transfer means.

6. The intermediate code memory of claim 5 further comprising means for emptying said stack means when said processing element transfer means is started.

7. The intermediate code memory of claim 5 further comprising:
   means for defining a window within said code RAM means; and
   means for blocking said processing element transfer means if said code RAM output addressing means addresses an element of said code RAM inside said window
   whereby said main memory transfer means and said processing element transfer means may operate simultaneously.

8. A process for inserting subprogram instructions into a processing routine instruction stream comprising the steps of:
   (a) initializing a memory address register, a memory count register, an input address register, an upper limit register and an output address register;
   (b) transferring instructions of said processing routine and said subprogram from a main memory at an address contained in said memory address register to a temporary storage memory at an address contained in said input address register;

(c) transferring said instructions from said temporary storage memory at an address contained in said output address register address to a processing element for processing;

(d) processing each subprogram call instruction during said transfer to said processing element comprising the steps of (d1) stacking said contents of said output address register into a top element of a LIFO stack, (d2) storing a subprogram address from said subprogram call instruction into said output address register, and (d3) preventing said transfer to said processing element of said subprogram call instruction;

(e) processing each subprogram return instruction during said transfer to said processing element comprising the steps of (e1) unstacking said top element of said LIFO stack, (e2) storing said top element into said output address register, and (e3) preventing said transfer to said processing element of said subprogram return instruction;

(f) processing certain branch instruction during said transfer to said processing element comprising the steps of (f1) storing an address from said branch instruction in said output address register, and (f2) preventing said transfer to said processing element of said branch instruction;

9. The process of claim 8 wherein step (c) further comprises the steps of:

(c1) comparing said contents of said output address register to contents of said input address register and contents of said upper limit register; and (c2) blocking said transfer to said processing element if said contents of said output address register is greater than or equal to said contents of said input address register, and less than said contents of said upper limit register.

10. The process of claim 9 wherein step b further comprises the steps of:

(b1) decrementing said memory count register each time data is transferred from said main memory; and (b2) stopping said transfer when said memory count register decrements to zero.

11. The process of claim 10 further comprising the steps of:

(g) processing outside branch instructions comprising the steps of (g1) detecting an outside branch signal from said processing element, (g2) receiving an outside branch address from said processing element, and (g3) storing said outside branch address in said output address register.

12. An intermediate code memory located between a main memory and a processing element of a computer, comprising:

code RAM means for temporarily storing processor instructions, said code RAM means having input addressing means and output addressing means;

direct memory access transfer means for transferring a segment of processor instructions from said main memory to said code RAM means;

processing element transfer means for transferring a stream of processor instructions from said code RAM means to said processing element;

means for defining a window within said code RAM means;

means for blocking said processing element transfer means if said code RAM output addressing means addresses an element of said code RAM inside said window;

means for detecting and processing subprogram calls and returns and branch instructions comprising LIFO stack means for storing code RAM addresses, stack transfer means for transferring the contents of said code RAM output addressing means to said LIFO stack means, code RAM address transfer means for transferring an output of said stack means to said code RAM output addressing means, instruction transfer means for transferring an address within a branch instruction to said code RAM output addressing means, first control means for detecting subprogram call instructions and activating said stack transfer means, second control means for detecting subprogram return instructions and activating said code RAM address transfer means, and third control means for detecting branch instructions and activating said instruction transfer means; and means for processing outside branch instructions comprising detecting means for detecting an outside branch signal from said processing element which indicates an outside branch is being processed, means for transferring an address returned to said intermediate code memory from said processing element to said code RAM addressing means, and means for emptying said LIFO stack means;

means for removing said subprogram call and return and said branch instructions from said instruction stream before said processor instructions are transferred to said processing element.

* * * * *